(12) United States Patent
Hsieh et al.

(10) Patent No.: US 7,733,536 B2
(45) Date of Patent: Jun. 8, 2010

(54) METHOD AND APPARATUS FOR ADJUSTING CONTRAST OF IMAGE

(75) Inventors: Tung-Lin Hsieh, Chung Li (TW);
Yu-Wen Huang, Sanchong (TW);
Hsin-Hung Lee, Kaohsiung (TW);
Hsu-Hung Chen, Sanchong (TW)

(73) Assignee: Quanta Computer, Inc. (TW)

( * ) Notice: Subject to any disclaimer, the term of this patent is extended or adjusted under 35 U.S.C. 154(b) by 810 days.

(21) Appl. No.: 11/595,713

(22) Filed: Nov. 10, 2006

(65) Prior Publication Data

US 2007/0216972 A1    Sep. 20, 2007

(30) Foreign Application Priority Data

Mar. 16, 2006    (TW) ............................. 95108875 A

(51) Int. Cl.
*G03F 3/08*    (2006.01)

(52) U.S. Cl. ................. 358/3.27; 358/520; 382/274

(58) Field of Classification Search ................. 358/1.9, 358/3.27, 501, 518, 520; 382/162, 167, 254, 382/274

See application file for complete search history.

(56) References Cited

U.S. PATENT DOCUMENTS 6,351,558 B1 * 2/2002 Kuwata ..................... 382/168
7,113,306 B1 * 9/2006 Nakabayashi et al. ........ 358/1.9
2004/0184057 A1   9/2004 Nakabayashi et al.

OTHER PUBLICATIONS

Office Action from Taiwan Patent Office mailed Sep. 29, 2009.

* cited by examiner

*Primary Examiner*—Thomas D Lee
(74) *Attorney, Agent, or Firm*—Thomas, Kayden, Horstemeyer & Risley, LLP

(57) ABSTRACT

An apparatus for processing an input image including M image units is provided. Each of the M image units respectively includes N pixels. Each of the pixels respectively has an original gray scale. The apparatus includes a converting module, a gain generating module, and a contrast enhancing module. The converting module is used for generating M luminances. Based on the original gray scales of the N pixels in the ith image unit among the M image units, the converting module generates the ith luminance among the M luminances. A maximum luminance and a minimum luminance are generated based on the M luminances. The gain generating module generates a contrast gain and a minimum gray scale based on the maximum luminance and the minimum luminance. Based on the contrast gain and the minimum gray scale, the contrast enhancing module adjusts the original gray scales of the pixels in the input image.

14 Claims, 9 Drawing Sheets

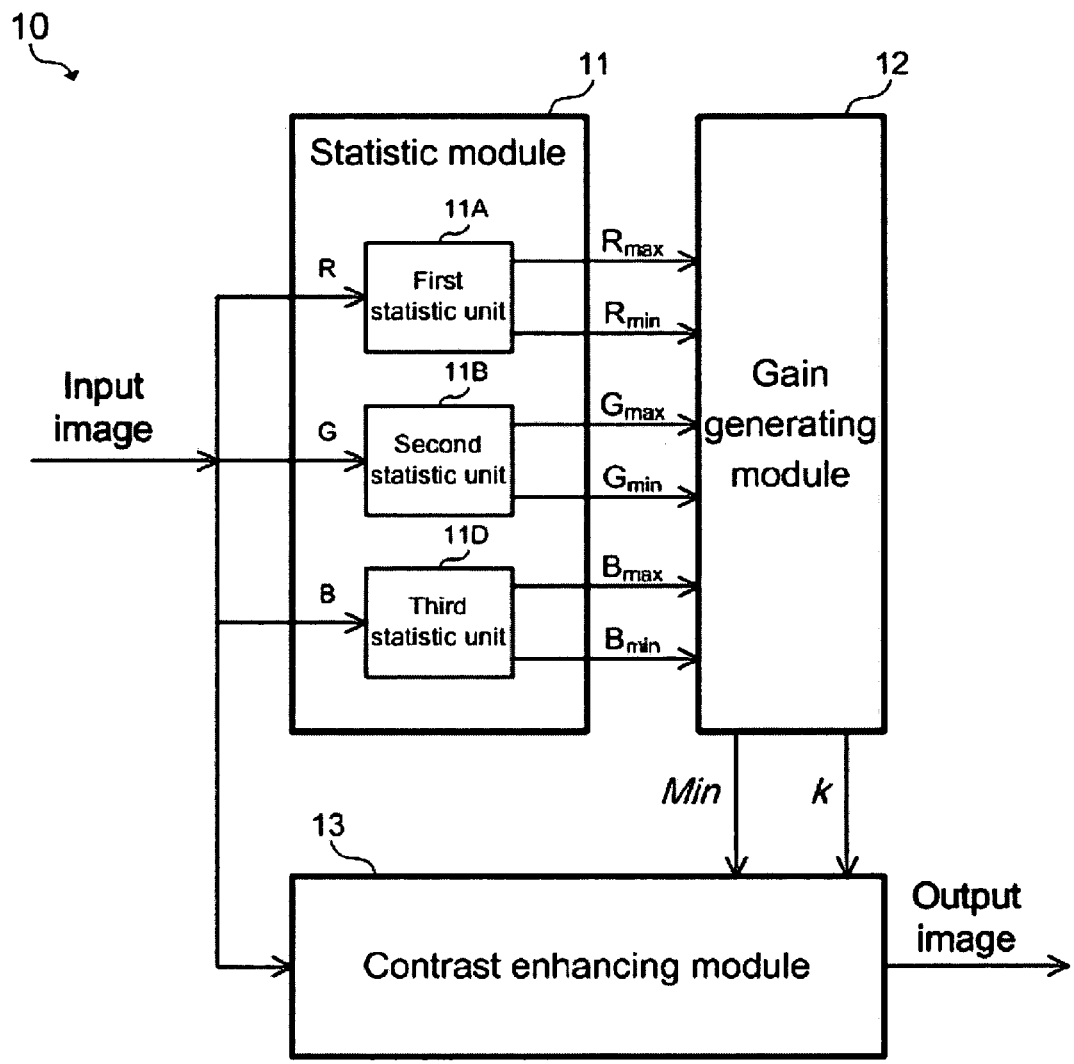
FIG.1 (Prior Arts)

METHOD AND APPARATUS FOR ADJUSTING CONTRAST OF IMAGE

BACKGROUND OF THE INVENTION

1. Field of the Invention

The present invention relates to image processing methods and apparatuses and, in particular, to methods and apparatuses for image contrast stretching.

2. Description of the Prior Art

Image contrast stretching refers to extending the gray scales of an image to the maximum extent of a monitor. Taking a monitor capable of showing eight-bit gray scales as an example, the 256 gray scales are usually represented as gray scale 0 to gray scale 255. Generally, since image signals lose part of the gray scales due to signal degradation or noise disturbance or so on, the number of gray scales received at the monitor is usually smaller than 256. The object of image contrast stretching is to increase the distribution of gray scales of an image, and thereby enhance the contrast and quality of the image.

Please refer to FIG. 1, which illustrates the block diagram of an apparatus for image contrast stretching in prior arts. The apparatus 10 includes three blocks: a statistic module 11, a gain generating module 12, and a contrast enhancing module 13. The statistic module 11 further includes a first statistic unit 11A, a second statistic unit 11B, and a third statistic unit 11C.

A colored image includes red, green, and blue pixels. The first statistic unit 11A, the second statistic unit 11B, and the third statistic unit 11C are respectively used to statistically calculate the distribution of the gray scales of the red, green, and blue pixels in an input image. The statistic results are depicted as the histograms shown in FIG. 2. FIG. 2(A)~2(C) respectively show the distributions of the gray scales of the red, green, and blue pixels in an image. In each histogram, the horizontal axis indicates gray scale values (ranging from 0 to 256), and the vertical axis indicates the number of pixels that have a corresponding gray scale value. By the histograms, we can get the distribution of gray scales of the input image.

According to the histograms, the first statistic unit 11A, the second statistic unit 11B, and the third statistic unit 11C can respectively find the maximum gray scales ($R_{max}$, $G_{max}$, $B_{max}$) and the minimum gray scales ($R_{min}$, $G_{min}$, $B_{min}$) corresponding to the red pixels, green pixels, and blue pixels. In some image processing methods in prior arts, the maximum gray scale is defined as the gray scale corresponding to the 0.5% area from the right of the histogram, while the minimum gray scale is defined as the gray scale corresponding to the 0.5% area from the left of the histogram.

Then, the gain generating module 12 selects the maximum one among the three maximum gray scales of the pixels as the maximum gray scale of the input image. Similarly, the minimum gray scale of the input image is the minimum one among the three minimum gray scales of the pixels. The traditional equation of image contrast stretching is:

$$G'' = 255 \times \frac{G - \text{Min}}{\text{Max} - \text{Min}}, \quad \text{(Equation 1)}$$

wherein G represents the original gray scale of some pixels, and G'' represents the stretched gray scale of the pixels.

Equation 1 can be rewritten into another form:

$$G'' = k \times (G - \text{Min}) \quad \text{(Equation 2)}$$

wherein $$k = \frac{255}{\text{Max} - \text{Min}}. \quad \text{(Equation 3)}$$

The value k in Equation 3 is generally called a contrast stretching coefficient or contrast gain.

The gain generating module 12 first calculates the contrast gain (k) according to Equation 3 and sends the minimum gray scale (Min) and the contrast gain (k) to the contrast enhancing module 13. The contrast enhancing module 13 performs a contrast stretching calculation on each pixel of the input image according to Equation 2 and accordingly obtains the output image.

Taking the image shown in FIG. 3(A) as an example, the original maximum gray scale is 151, and the original minimum gray scale is 0 in this image. According to Equation 3, k is calculated to be 1.59, and the result of image contrast stretching is shown in FIG. 3(B). By comparison, we can find that the contrast of the image in FIG. 3(B) is much higher than that in FIG. 3(A).

The drawback of prior arts is that three statistic units are needed for calculating the individual distributions of the gray scales of the red pixels, green pixels, and blue pixels. Therefore the hardware resource is considerably consumed.

SUMMARY OF THE INVENTION

To solve the problem above, the invention provides methods and apparatuses for image processing. Generally, each colored image can be divided into a large number of small areas individually containing red pixels, green pixels, and blue pixels. The methods and apparatuses, according to this invention, firstly integrate the gray scales of the red pixels, green pixels, and blue pixels in each area into a luminance and then calculate the luminance distribution of the image by statistic. Based on the maximum and minimum luminances chosen by the statistic result, this invention can generate the minimum gray scale and the contrast gain for contrast stretching. Compared to prior arts, the image processing apparatus, according to this invention, requires only one statistic unit, and the hardware cost is tremendously reduced.

One preferred embodiment, according to this invention, is an apparatus for processing an objective video frame. The objective video frame is included in a video stream and includes M image units. Each of the M image units respectively includes N original pixels. M and N are positive integers. Each of the original pixels respectively has an original gray scale. In this embodiment, the apparatus includes a converting module, a gain generating module, and a contrast enhancing module. The converting module is used for generating M luminances, and the converting module generates the ith luminance among the M luminances based on the original gray scales of the N original pixels in the ith image unit among the M image units. The value i is an integer index ranging from 1 to M. The converting module also generates a maximum luminance and a minimum luminance according to the M luminances. Then, the gain generating module generates a contrast gain and a minimum input gray scale based on the maximum luminance and the minimum luminance. The contrast enhancing module adjusts the original gray scales of the input image according to the contrast gain and the minimum input gray scale to generate an output video frame.

Another preferred embodiment, according to this invention, is a method for processing an objective video frame. The method firstly generates M luminances. The ith luminance among the M luminances is generated based on the original gray scales of the N original pixels in the ith image unit among the M image units. Then, the method generates a maximum luminance and a minimum luminance according to the M luminances. Then, the method generates a contrast gain and a minimum input gray scale based on the maximum luminance and the minimum luminance. The method adjusts the original gray scales of the input image according to the contrast gain and the minimum input gray scale to generate an output video frame.

The advantage and spirit of the invention may be understood by the following recitations together with the appended drawings.

BRIEF DESCRIPTION OF THE APPENDED DRAWINGS

FIG. 1 shows the block diagram of the image contrast stretching apparatus in prior arts.

DETAILED DESCRIPTION OF THE INVENTION

The main purpose of this invention is to provide image processing methods and apparatuses for enhancing the contrast of an image. This invention can be used to adjust a single image or a video frame in a video stream.

This invention assumes that an objective video frame includes M image units, and each of the M image units respectively includes N original pixels. M and N are positive integers. Each of the original pixels respectively has an original gray scale. Each of the original pixels in the objective video frame is selectively a red pixel (R), a green pixel (G), or a blue pixel (B).

Figure 2A:
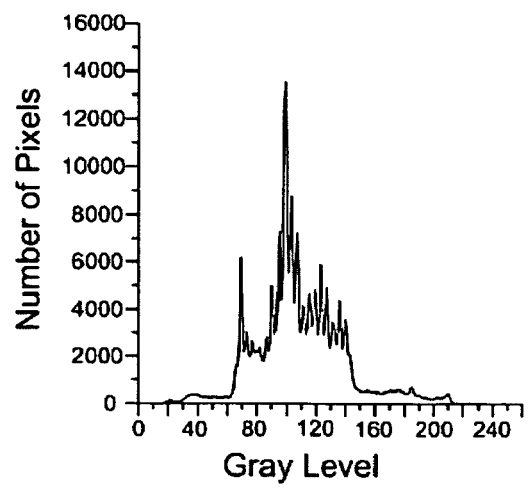
FIG. 2 shows an example of a histogram.
Figure 2B:
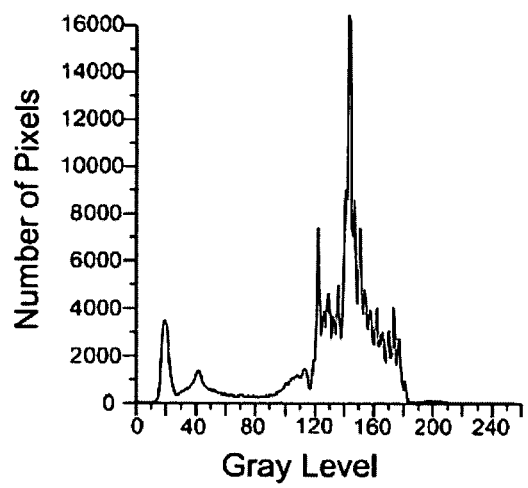
Figure 2C:
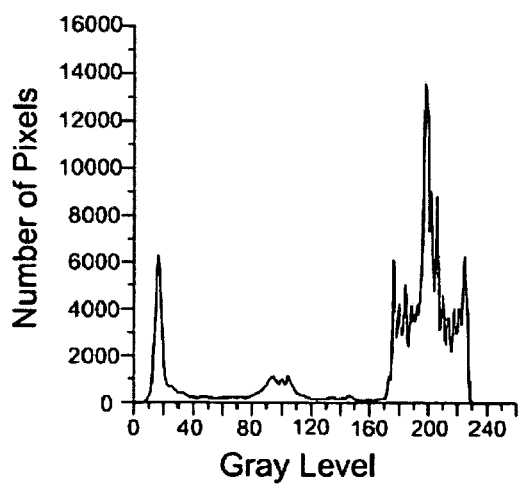
Figure 3A:
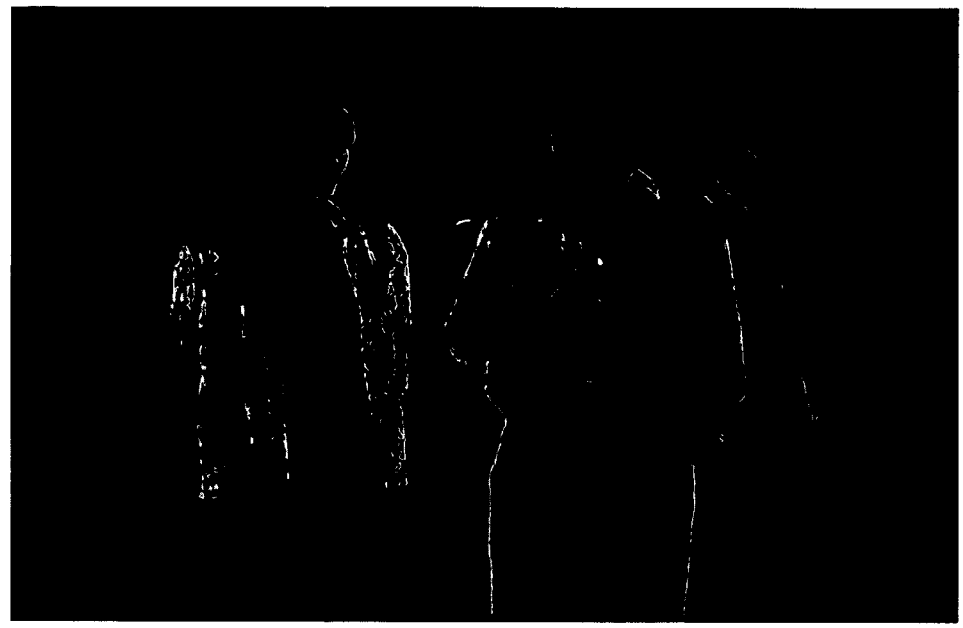
FIG. 3 shows an example of an image before/after image contrast stretching.
Figure 3B:
Figure 4:
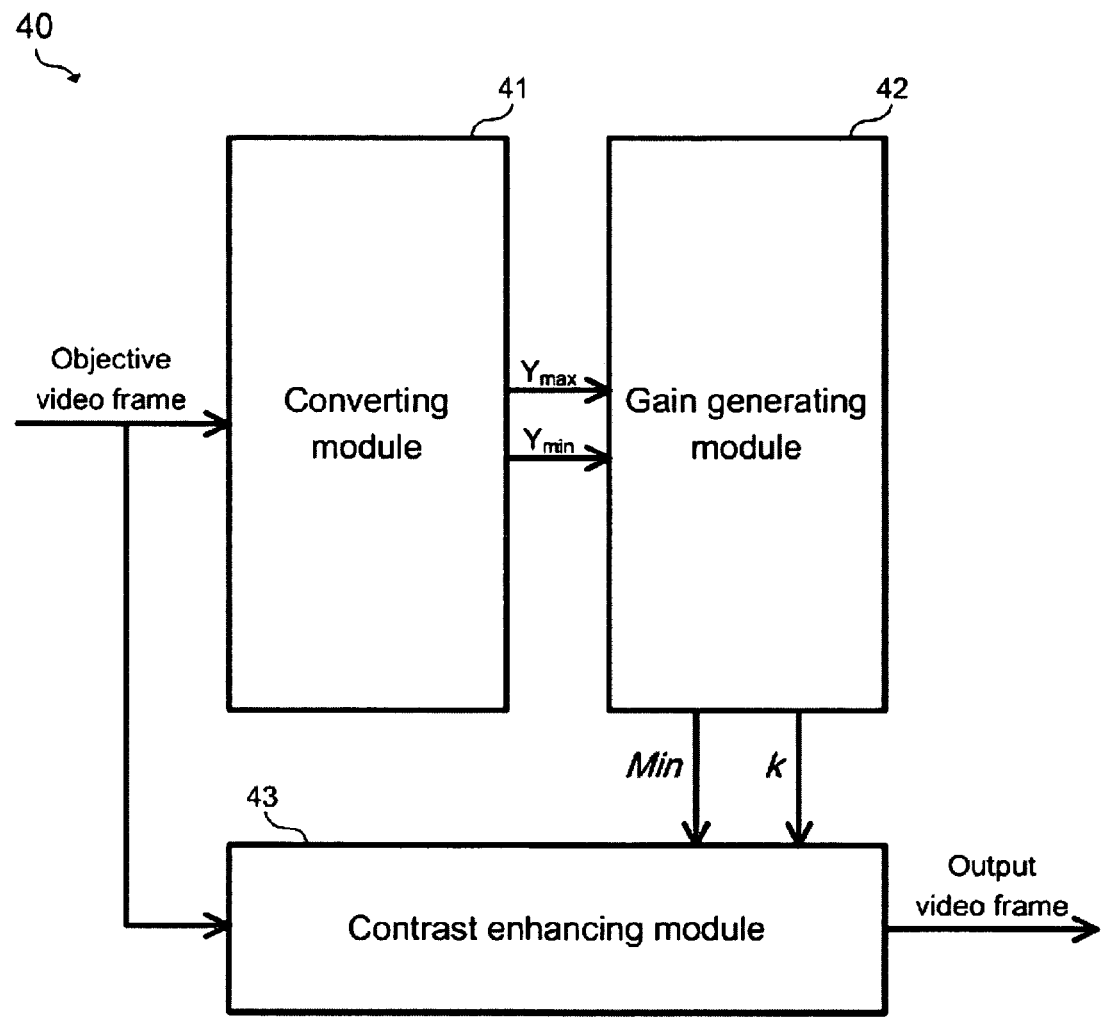
FIG. 4 shows the block diagram of the image processing apparatus of the first preferred embodiment according to the invention.

The first preferred embodiment, according to this invention, is an image processing apparatus. The block diagram of this image processing apparatus 40 is shown in FIG. 4. The apparatus 40 includes a converting module 41, a gain generating module 42, and a contrast enhancing module 43.

The converting module 41 first receives the M image units sequentially or simultaneously, so as to generate a luminance (Y) for each image unit among the M image units. More specifically, the converting module 41 generates the ith luminance among M luminances based on the original gray scales of the N original pixels in the ith image unit among the M image units. The value i is an integer index ranging from 1 to M. After that, the converting module 41 uses statistic methods, such as histograms, to generate a maximum luminance ($Y_{max}$) and a minimum luminance ($Y_{min}$) on the basis of the M luminances. The gain generating module 42 generates a contrast gain (k) and a minimum input gray scale ($M_{min}$) according to the maximum luminance ($Y_{max}$) and the minimum luminance ($Y_{min}$). The contrast enhancing module 43 adjusts the original gray scales of the input image according to the contrast gain (k) and the minimum input gray scale (Min) to generate an output video frame.

Assuming that the ith image unit among the M image units includes a red original pixel, a green original pixel, and a blue original pixel, the red pixel has a first gray scale ($R_i$), the green pixel has a second gray scale ($G_i$), and the blue pixel has a third gray scale ($B_i$). In practice, the converting module 41 can calculate $Y_i$ according to the following equation:

$$Y_i = 0.299 * R_i + 0.587 * G_i + 0.114 * B_i. \qquad \text{(Equation 4)}$$

Equation 4 is a known converting equation used to represent the relation between the luminance of an image unit and the gray scales of the red pixels, green pixels, and blue pixels in the image unit.

Figure 5A:
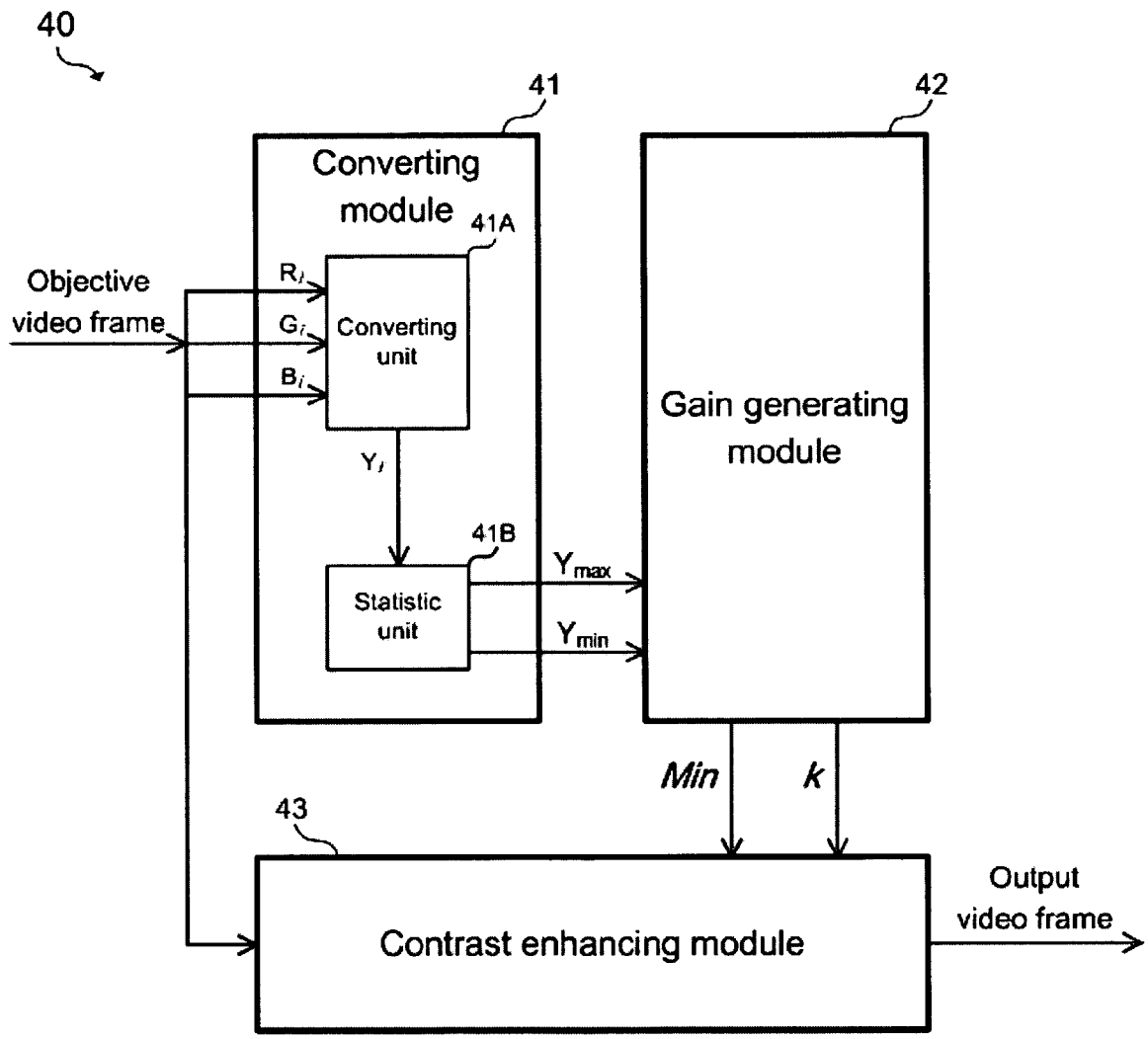
FIG. 5 shows a plurality of possible embodiments of the converting module and the gain generating module.

FIG. 5(A) depicts a possible configuration of the converting module 41. The converting unit 41A generates $Y_i$ according to the $R_i$, $G_i$, and $B_i$ of the ith image. The statistic unit 41B selects the maximum luminance ($Y_{max}$) and the minimum luminance ($Y_{min}$) from the M luminances ($Y_1 \sim Y_M$) by statistic.

Figure 5B:
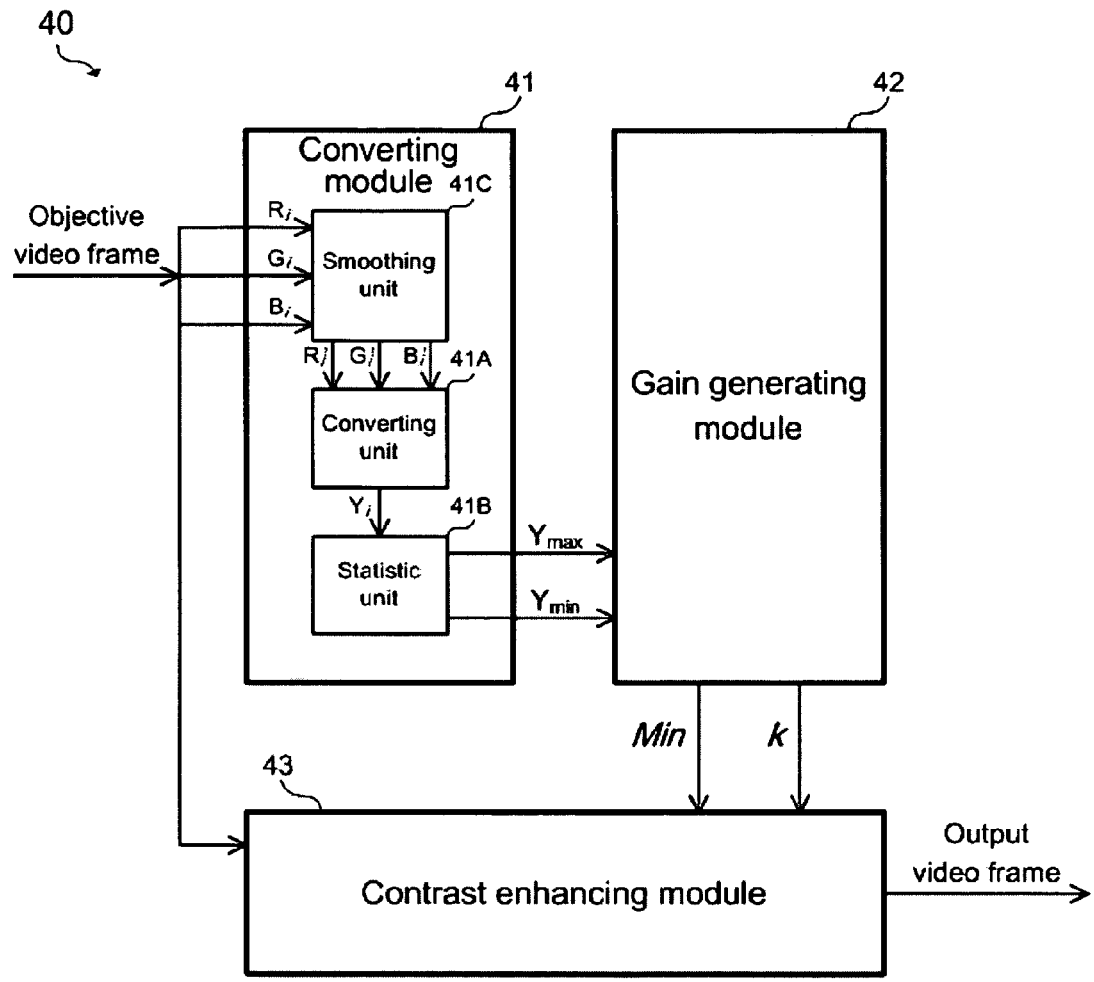

The objective video frame could have been sharpened by other image processing chips before entering the image processing apparatus 40. To eliminate sharpening effects on the input gray scales, the gain generating module 41 can selectively include a smoothing unit 41C as shown in FIG. 5(B). The smoothing unit 41C firstly performs a smoothing calculation on the $R_i$, $G_i$, and $B_i$ of the ith image unit and generates smoothed gray scales $R_i'$, $G_i'$, and $B_i'$ of the ith image unit. The converting unit 41A then converts $R_i'$, $G_i'$, and $B_i'$ into $Y_i$. The statistic unit 41B equally selects the maximum luminance ($Y_{max}$) and the minimum luminance ($Y_{min}$) from the M luminances ($Y_1 \sim Y_M$) by statistic.

Figure 5C:
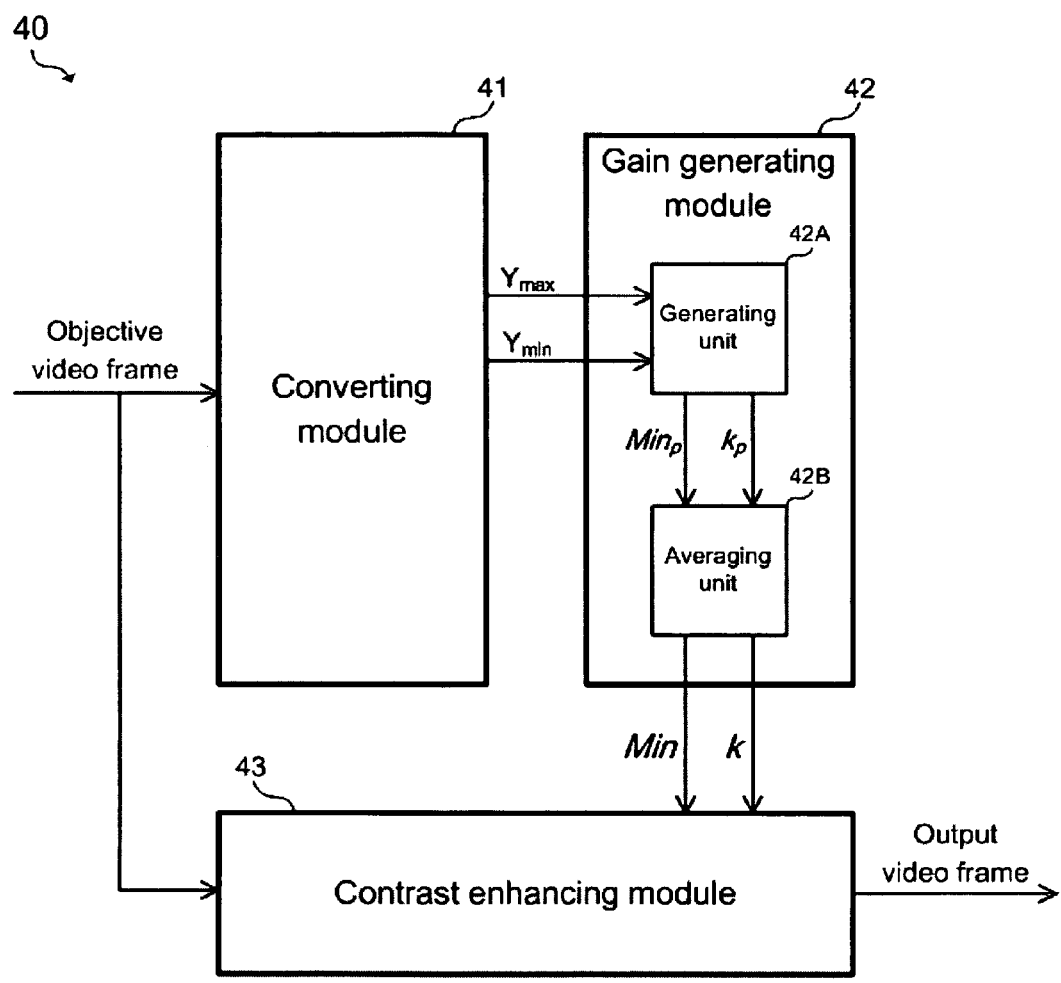

On the other hand, the noise can deviate the maximum luminance ($Y_{max}$) and the minimum luminance ($Y_{min}$) selected by the converting module 41 and further make the consequently generated contrast gain (k) abnormally larger or smaller. The gain generating module 42 can selectively include an averaging unit 42B as shown in FIG. 5(C). Assume that the objective video frame is adjacent to P adjacent video frames in the video stream. P is a positive integer. First, the generating unit 42A shown in FIG. 5(C) generates a preliminary gain ($k_p$) and a preliminary minimum gray scale ($Min_p$) by a lookup table according to the maximum luminance ($Y_{max}$) and the minimum luminance ($Y_{min}$). The averaging unit 42B then averages the preliminary gain ($k_p$) with P adjacent gains relative to the P adjacent video frames, generating a contrast gain (k). The P adjacent gains are respectively the contrast gain of the P adjacent video frames. The averaging unit 42B also averages the preliminary minimum gray scale ($Min_p$) with P adjacent minimum gray scale to generate a minimum gray scale (Min). The P adjacent minimum gray scales are respectively the minimum gray scale of P adjacent video frames. By this averaging method, this invention reduces the effect of noises and avoids the problem of image flickering caused by noises.

In practical applications, the contrast enhancing module 43 performs stretching calculation on each pixel in the input video frame according to Equation 2, the contrast gain (k), and the minimum input gray scale (Min) to obtain the output video frame.

Figure 6:
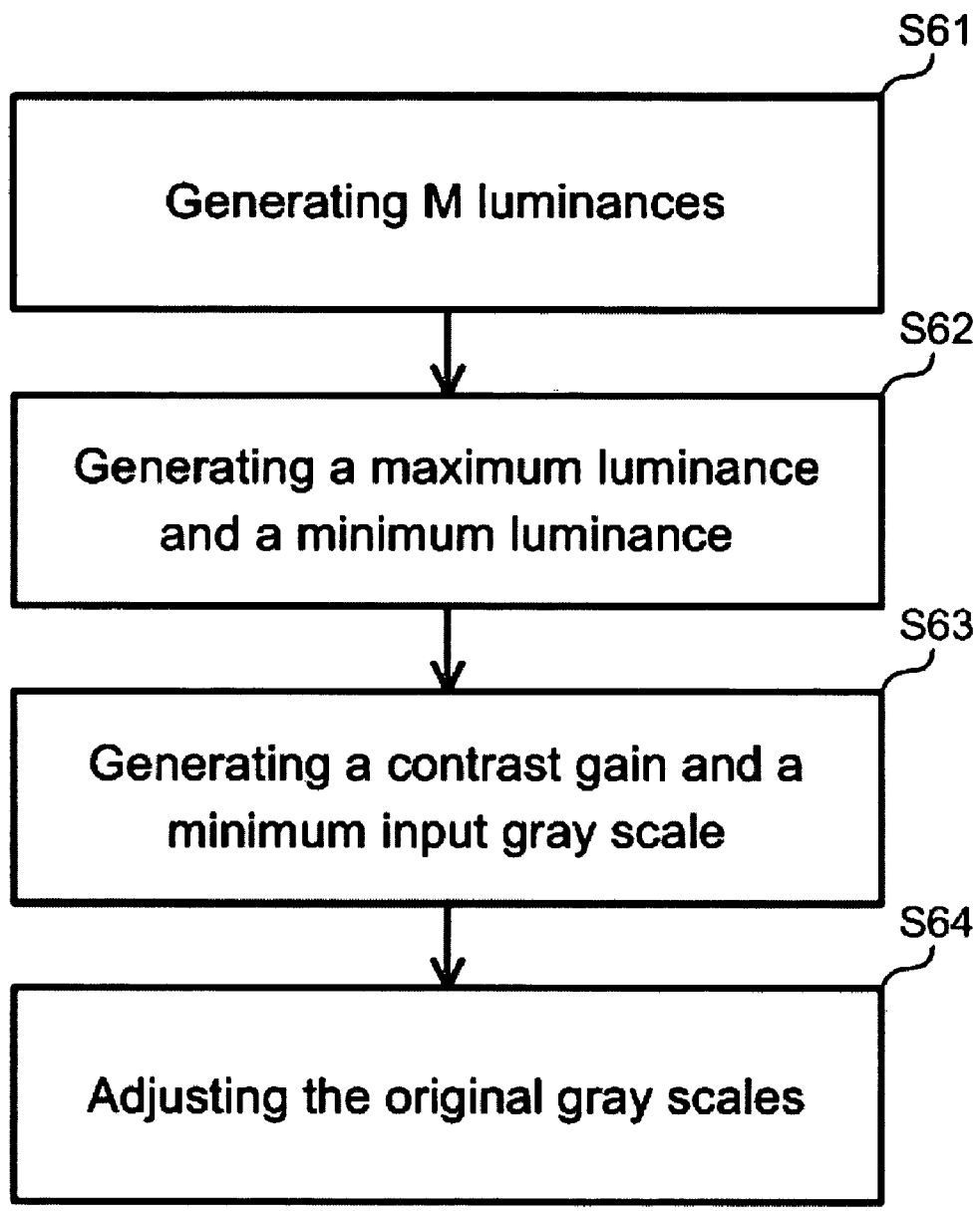
FIG. 6 shows the flow chart of the image processing method of the second preferred embodiment according to the invention.

Please refer to FIG. 6. The second preferred embodiment, according this invention, is a method for processing an objective video frame. In step S61, M luminances are generated. The ith luminance among the M luminances is generated based on the original gray scales of the N original pixels in the ith image unit among the M image units. The value i is an integer index ranging from 1 to M. After that, in step S62, a maximum luminance ($Y_{max}$) and a minimum luminance ($Y_{min}$) are generated on the basis of the M luminances. In step S63, a contrast gain (k) and a minimum input gray scale (Min) are generated according to the maximum luminance ($Y_{max}$) and the minimum luminance ($Y_{min}$). Finally, in step S64, the original gray scales of the original pixels of the objective video frame are adjusted according to the contrast gain (k) and the minimum input gray scale (Min) to generate an output video frame.

Figure 7A:
FIG. 7 shows the experimental result of the invention.
Figure 7B:
Figure 7C:

Please refer to FIG. 7. FIG. 7(A) shows an example picture without image stretching. FIG. 7(B) shows the processed result of the FIG. 7(A) processed by the image contrast stretching technology of prior arts. FIG. 7(C) shows the processed result of FIG. 7(A) processed by the methods/apparatuses of this invention. By contrast, the results shown in FIG. 7(C) and FIG. 7(B) are similar.

Proved by experiments, the result of using the image contrast stretching method according to this invention is similar to that of the prior art. Furthermore, the image processing apparatus according to the invention requires only one statistic unit; thus, plenty of hardware cost is saved. For example, suppose that each statistic unit requires memory of 256 bits. Then, the image processing apparatus of prior arts requires a memory of 256*3 bits while the apparatus, according to the invention, requires only a memory of 256 bits.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An apparatus for processing an objective video frame in a video stream, the objective video frame comprising M image units and being adjacent to P adjacent video frames in the video stream, each of the M image units respectively comprising N original pixels P, M and N being positive integers, each of the original pixels respectively having an original gray scale, said apparatus comprising:
   a converting module for generating M luminances, based on the original gray scales of the N original pixels in the ith image unit among the M image units, the converting module generating the ith luminance among the M luminances, i being an integer index ranging from 1 to M, the converting module generating a maximum luminance ($Y_{max}$) and a minimum luminance ($Y_{min}$) based on the M luminances;
   a gain generating module for generating a preliminary gain and a preliminary minimum input gray scale based on the maximum luminance ($Y_{max}$) and the minimum luminance ($Y_{min}$), the gain generating module generating a contrast gain (k) based on the preliminary gain with P adjacent gains relative to the P adjacent video frames, the gain generating module generating a minimum input gray scale (Min) based on the preliminary minimum input gray scale and P adjacent minimum gray scales relative to the P adjacent video frames; and
   a contrast enhancing module, based on the contrast gain (k) and the minimum input gray scale (Min), the contrast enhancing module adjusting the original gray scales of the original pixels in the objective video frame to generate an output video frame.

2. The apparatus of claim 1, wherein each of the original pixels in the objective video frame is selectively a red pixel, a green pixel, or a blue pixel.

3. The apparatus of claim 2, wherein the N original pixels in the ith image unit comprise a red pixel, a green pixel, and a blue pixel; the red pixel has a first gray scale ($R_i$), the green pixel has a second gray scale ($G_i$), and the blue pixel has a third gray scale ($B_i$).

4. The apparatus of claim 3, wherein the converting module generates the ith luminance ($Y_i$) according to the following equation:

$$Y_i = a*R_i b*G_i c*B_i$$

wherein a, b, c are gain coefficients.

5. The apparatus of claim 4, wherein a is 0.299, b is 0.587, and c is 0.114.

6. The apparatus of claim 1, wherein the converting module comprises:
   a converting unit for generating the ith luminance among the M luminances based on the original gray scales of the N original pixels in the ith image unit among the M image units; and
   a statistic unit for finding out the maximum luminance ($Y_{max}$) and the minimum luminance ($Y_{min}$) from the M luminances by statistics.

7. The apparatus of claim 1, wherein the converting module comprises:
   a smoothing unit for performing a smoothing calculation on the original gray scales of the N original pixels in the ith image unit to generate N smoothed gray scales for the ith image unit;
   a converting unit for generating the ith luminance among the M luminances based on the N smoothed gray scales corresponding to the ith image unit; and
   a statistic unit for finding out the maximum luminance ($Y_{max}$) and the minimum luminance ($Y_{min}$) from the M luminances by statistics.

8. A method for processing an objective video frame in a video stream, the objective video frame comprising M image units and being adjacent to P adjacent video frames in the video stream, each of the M image units respectively comprising N original pixels P, M and N being positive integers, each of the original pixels respectively having an original gray scale, said method comprising the steps of:
   (a) generating M luminances, based on the original gray scales of the N original pixels in the ith image unit among the M image units, the ith luminance among the M luminances being generated, i being an integer index ranging from 1 to M;
   (b) generating a maximum luminance ($Y_{max}$) and a minimum luminance ($Y_{min}$) based on the M luminances;
   (c) generating a preliminary gain and a preliminary minimum input gray scale based on the maximum luminance ($Y_{max}$) and the minimum luminance ($Y_{min}$);
   (d) generating a contrast gain (k) based on the preliminary gain with P adjacent gains relative to the P adjacent video frames, and generating the minimum input gray scale (Min) based on the preliminary minimum input gray scale and P adjacent minimum gray scales relative to the P adjacent video frames; and
   (e) based on the contrast gain (k) and the minimum input gray scale (Min), adjusting the original gray scales of the original pixels in the objective video frame to generate an output video frame.

9. The method of claim 8, wherein each of the original pixels in the objective video frame is selectively a red pixel, a green pixel, or a blue pixel.

10. The method of claim 9, wherein the N original pixels in the ith image unit comprises a red pixel, a green pixel, and a blue pixel; the red pixel has a first gray scale ($R_i$), the green pixel has a second gray scale ($G_i$), and the blue pixel has a third gray scale ($B_i$).

11. The method of claim 10, wherein in step (a), the ith luminance ($Y_i$) is generated according the following equation:

$$Y_i = a*R_i + b*G_i + c*B_i,$$

wherein a, b, c are gain coefficients.

12. The method of claim 11, wherein a is 0.299, b is 0.587, and c is 0.114.

13. The method of claim 8, wherein step (a) comprises the sub-steps of:
(a1) performing a smoothing calculation on the original gray scales of the N original pixels in the ith image unit to generate N smoothed gray scales; and
(a2) generating the ith luminance for the ith image unit based on the N smoothed gray scales.

14. The method of claim 8, wherein in step (b), the maximum luminance ($Y_{max}$) and the minimum luminance ($Y_{min}$) are found out from the M luminances by statistics.

* * * * *